US012735550B2

(12) United States Patent
Li et al.

(10) Patent No.: US 12,735,550 B2
(45) Date of Patent: Sep. 15, 2026

(54) METHOD FOR TREATING WASTE PLASTIC BASED ON PERSULFATE SYSTEM

(71) Applicant: Tianjin University, Tianjin (CN)

(72) Inventors: Ning Li, Tianjin (CN); Hengxin Liu, Tianjin (CN); Guanyi Chen, Tianjin (CN); Beibei Yan, Tianjin (CN); Zhanjun Cheng, Tianjin (CN); Shengquan Zhou, Tianjin (CN); Xiaochao Zhu, Tianjin (CN)

(73) Assignee: Tianjin University, Tianjin (CN)

( * ) Notice: Subject to any disclaimer, the term of this patent is extended or adjusted under 35 U.S.C. 154(b) by 594 days.

(21) Appl. No.: 18/341,805

(22) Filed: Jun. 27, 2023

(65) Prior Publication Data

US 2024/0262974 A1 Aug. 8, 2024

(30) Foreign Application Priority Data

Feb. 3, 2023 (CN) ......................... 202310078264.8

(51) Int. Cl.
*C08J 11/16* (2006.01)
*C10L 1/04* (2006.01)

(52) U.S. Cl.
CPC ................. *C08J 11/16* (2013.01); *C10L 1/04* (2013.01); *C08J 2323/06* (2013.01); *C08J 2367/02* (2013.01); *C10L 2200/0461* (2013.01)

(58) Field of Classification Search
CPC .......... C08J 11/14; C08J 11/16; Y02W 30/62; Y02P 20/143
See application file for complete search history.

(56) References Cited

FOREIGN PATENT DOCUMENTS

| | | | | |
|---|---|---|---|---|
| CN | 114951237 A * | 8/2022 | ............... | B09B 3/00 |
| WO | WO-2019000039 A1 * | 1/2019 | ............ | C08K 3/012 |

OTHER PUBLICATIONS

Machine Translation of CN114951237A. Aug. 30, 2022. (Year: 2022).*
Hu et al. Degradation of Microplastics by a Thermal Fenton Reaction. ACS EST Engg. 2022, 2, 110-120. Published Nov. 24, 2021. (Year: 2021).*
Liu et al. Process analysis of microplastic degradation using activated PMS and Fenton reagents Chemosphere 2022, 298, 134220. Published Mar. 14, 2022. (Year: 2022).*
Ghanbari et al. Application of peroxymonosulfate and its activation methods for degradation of environmental organic pollutants: Review. Chemical Engineering Journal, 2017, 310, 41-62. Published Oct. 15, 2016. (Year: 2016).*
Lu et al. Plasma boosted the conversion of waste plastics into liquid fuel by a peroxymonosulfate-hydrothermal process. Chemical Engineering Journal, 2022, 446, 137236. Published May 28, 2022. (Year: 2022).*

* cited by examiner

*Primary Examiner* — Stephen E Rieth
(74) *Attorney, Agent, or Firm* — Bayramoglu Law Offices LLC

(57) ABSTRACT

A method for treating a waste plastic based on a persulfate system is provided. The method includes the following steps: mixing the waste plastic, sulfuric acid, sulfate, peroxymonosulfate, and water, and reacting at 80-140° C. for 3-15 h to complete the treatment; where the waste plastic is polyethylene or polyethylene terephthalate; and the sulfate is copper sulfate or ferrous sulfate. The present invention reasonably regulates and controls each parameter in the reaction process while constructing a homogeneous catalysis system of transition metal activated peroxymonosulfate, and finally directionally converts the waste plastic into $C_7H_{12}$ and $C_{10}H_{12}$ fuels, which realizes high-efficiency recycling of the waste plastic, has a simple and convenient working procedure, and has a wide application prospect.

12 Claims, 2 Drawing Sheets

100
80
60
40
20
0
Yield (%)
$C_7H_{12}$
$C_{10}H_{12}$
Product type

METHOD FOR TREATING WASTE PLASTIC BASED ON PERSULFATE SYSTEM

CROSS REFERENCE TO THE RELATED APPLICATIONS

This application is based upon and claims priority to Chinese Patent Application No. 202310078264.8, filed on Feb. 3, 2023, the entire contents of which are incorporated herein by reference.

TECHNICAL FIELD

The present invention relates to the technical field of solid waste-to-energy, and in particular, to a method for treating a waste plastic based on a persulfate system.

BACKGROUND

In recent years, with the continuous development of industry, agriculture, and fishery, the global demand for plastics has increased rapidly, leading to an increase in the annual output of plastic waste. The plastic is a macromolecular polymer with a stable structure, is not easy to be destroyed by microorganisms in nature, can affect soil function and agricultural production, threatens the survival of animals, and causes white pollution. In addition, the plastic can also produce microplastics, and endangers ecological safety. Incineration disposal has a very low demand for raw material pretreatment, convenient operation, high disposal efficiency, relatively low cost, and a relatively mature process. However, incineration of waste plastics is accompanied by the generation of toxic organic gases such as polycyclic aromatic hydrocarbons, dioxins, and furans. Plastics containing chlorine and nitrogen (such as PVC and PU) and additives (such as a bromine-containing flame retardant) will release inorganic pollutants such as NOx, HCl, HBr, and HCN during the incineration process, which can easily cause secondary pollution to the environment. Due to the obvious difference in calorific value of various plastics, the instability of raw material composition will also cause the instability of combustion. In addition, most of the raw materials (such as ethylene, styrene, phenol, and formaldehyde) for plastic production are extremely important chemical raw materials with high recycling value, consequently, direct incineration of plastics is a waste of resources. Landfill has the characteristics of low cost, simple process, and strong applicability. However, the molecular bonds of elements such as nitrogen and chlorine in plastics and some additives further enhance the stability of macromolecular polymer and reduce the natural degradation rate of plastics. It is estimated that it will take 200-400 years for the PVC mulch plastic film in the soil to completely degrade naturally. Therefore, the landfill method will occupy a large amount of land resources for a long time. In addition, the plastic can be aged in the long-term landfill process, and toxic and harmful substances contained in the plastic can be leached out and diffused to the land of a landfill site; and the aging of plastic will also lead to the emission of large amounts of greenhouse gases. Therefore, how to provide an efficient treatment method that can realize the recycling of waste plastics is of great significance.

SUMMARY

An objective of the present invention is to overcome the problems in the prior art and provide a method for treating a waste plastic based on a persulfate system.

In order to achieve the above objective, the present invention provides the following technical solutions.

The present invention provides a method for treating a waste plastic based on a persulfate system, which comprises the following steps:

mixing the waste plastic, sulfuric acid, sulfate, peroxymonosulfate, and water, and then reacting to complete the treatment.

Preferably, the waste plastic is polyethylene or polyethylene terephthalate.

Preferably, the sulfate is copper sulfate or ferrous sulfate.

Preferably, the peroxymonosulfate is potassium peroxymonosulfate or sodium peroxymonosulfate.

Preferably, the waste plastic in the mixed solution has a mass concentration of 1-5 g/L.

Preferably, the sulfuric acid in the mixed solution has a concentration of $5\times10^{-4}$-$5\times10^{-3}$ mol/L.

Preferably, when the sulfate is copper sulfate, the copper sulfate in the mixed solution has a concentration of 0.08-0.49 mmol/L; and when the sulfate is ferrous sulfate, the ferrous sulfate in the mixed solution has a concentration of 3-13 mmol/L.

Preferably, the peroxymonosulfate in the mixed solution has a concentration of 3-13 mmol/L.

Preferably, the reaction is performed at a temperature of 80-140° C.

Preferably, the reaction is performed for 3-15 h.

The beneficial effects of the present invention are as follows.

The present invention provides a method for treating a waste plastic based on a persulfate system, which comprises the following steps: mixing the waste plastic, sulfuric acid, sulfate, peroxymonosulfate, and water, and reacting at 80-140° C. for 3-15 h to complete the treatment; wherein the waste plastic is polyethylene or polyethylene terephthalate; and the sulfate is copper sulfate or ferrous sulfate. The present invention reasonably regulates and controls each parameter in the reaction process while constructing a homogeneous catalysis system of transition metal (bivalent copper and bivalent iron) activated peroxymonosulfate, and finally directionally converts the waste plastic into $C_7H_{12}$ and $C_{10}H_{12}$ fuels, which realizes high-efficiency recycling of the waste plastic, has a simple and convenient working procedure, and has a wide application prospect.

DETAILED DESCRIPTION OF THE EMBODIMENTS

Figures 1, 2:
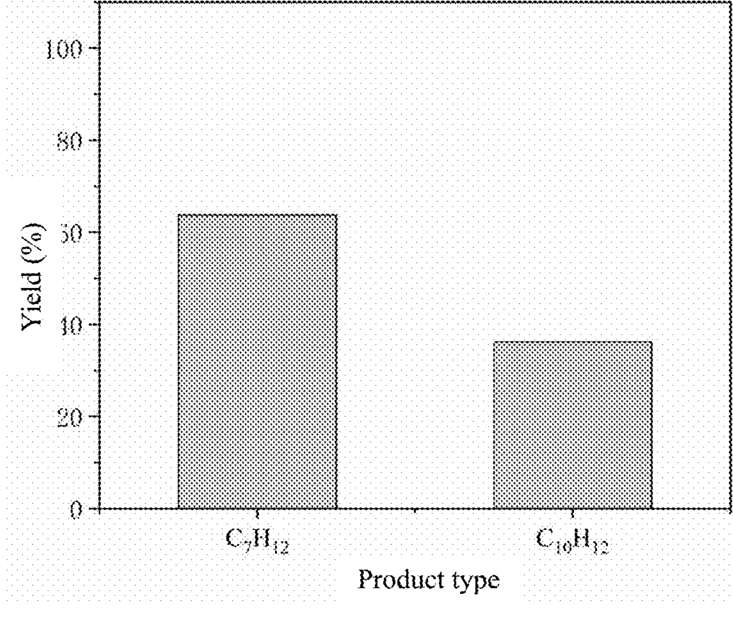
FIG. 1 is a graph showing the results of types and mass fractions of products according to Example 2.
FIG. 2 is a graph showing the results of types and mass fractions of products according to Example 6.

The present invention provides a method for treating a waste plastic based on a persulfate system, which comprises the following steps:

mixing the waste plastic, sulfuric acid, sulfate, peroxymonosulfate, and water, and then reacting to complete the treatment.

In the present invention, the waste plastic is preferably polyethylene or polyethylene terephthalate.

In the present invention, the sulfate is preferably copper sulfate or ferrous sulfate.

In the present invention, the peroxymonosulfate is preferably potassium peroxymonosulfate or sodium peroxymonosulfate.

In the present invention, the waste plastic in the mixed solution has a mass concentration of preferably 1-5 g/L, further preferably 2-4 g/L, and more preferably 2.5-3.5 g/L.

In the present invention, the sulfuric acid in the mixed solution has a concentration of preferably $5\times10^{-4}$-$5\times10^{-3}$ mol/L, further preferably $6\times10^{-4}$-$4\times10^{-3}$ mol/L, and more preferably $7\times10^{-4}$-$3\times10^{-3}$ mol/L.

In the present invention, when the sulfate is copper sulfate, the copper sulfate in the mixed solution has a concentration of preferably 0.08-0.49 mmol/L, further preferably 0.10-0.47 mmol/L, and more preferably 0.15-0.42 mmol/L; and when the sulfate is ferrous sulfate, the ferrous sulfate in the mixed solution has a concentration of preferably 3-13 mmol/L, further preferably 5-11 mmol/L, and more preferably 7-9 mmol/L.

In the present invention, the peroxymonosulfate in the mixed solution has a concentration of preferably 3-13 mmol/L, further preferably 5-11 mmol/L, and more preferably 7-9 mmol/L.

In the present invention, the reaction is performed at a temperature of preferably 80-140° C., further preferably 90-130° C., and more preferably 100-120° C.

In the present invention, the reaction is performed for preferably 3-15 h, further preferably 5-13 h, and more preferably 7-11 h.

In the present invention, the specific mechanism for converting a waste plastic into a fuel based on a persulfate system is as follows:

after sulfate and peroxymonosulfate (PMS) are added to the waste plastic, metal ions in the sulfate activate hydrogen peroxymonosulfate ($HSO_5^-$) to generate high-valence metals, $SO_4^{\cdot-}$, and $^{\cdot}OH$. In addition, two $HSO_5^-$; molecules interact to generate singlet oxygen ($^1O_2$), and electrons ($e^-$) react with dissolved oxygen to generate superoxide radicals ($O_2^{\cdot-}$). The interaction of ·OH with the carbon chain (RH) can generate an R· radical. Under the combined action of Cu(III), $SO_4^{\cdot-}$, $^1O_2$, and $O_2^{\cdot-}$, the C—C bond of the polymer in the plastic is broken, and finally transformed into $C_7H_{12}$ and $C_{10}H_{12}$ fuels.

The technical solutions provided by the present invention will be described in detail below with reference to the examples, which, however, should not be construed as limiting the scope of the present invention.

Example 1

Polyethylene (PE), sulfuric acid, copper sulfate, sodium peroxymonosulfate, and water were mixed well to obtain a mixed solution, wherein in the mixed solution, the PE had a mass concentration of 1 g/L, the sulfuric acid had a concentration of $5\times10^{-3}$ mol/L, the copper sulfate had a concentration of 0.0813 mmol/L, and the sodium peroxymonosulfate had a concentration of 3.25 mmol/L; and the mixed solution was reacted at 140° C. for 6 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 54.48%, and $C_{10}H_{12}$ fuel had a mass fraction of 45.52%.

Example 2

Polyethylene (PE), sulfuric acid, copper sulfate, sodium peroxymonosulfate, and water were mixed well to obtain a mixed solution, wherein in the mixed solution, the PE had a mass concentration of 1 g/L, the sulfuric acid had a concentration of $5\times10^{-3}$ mol/L, the copper sulfate had a concentration of 0.0813 mmol/L, and the sodium peroxymonosulfate had a concentration of 6.50 mmol/L; and the mixed solution was reacted at 140° C. for 15 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer to obtain a graph showing types and mass fractions of the products. As shown in FIG. 1, it can be seen that, in the product obtained in this example, $C_7H_{12}$ fuel had a mass fraction of 63.77%, and $C_{10}H_{12}$ fuel had a mass fraction of 36.23%.

Example 3

Polyethylene terephthalate (PET), sulfuric acid, copper sulfate, sodium peroxymonosulfate, and water were mixed well to obtain a mixed solution, wherein in the mixed solution, the PET had a mass concentration of 1 g/L, the sulfuric acid had a concentration of $5\times10^{-3}$ mol/L, the copper sulfate had a concentration of 0.0813 mmol/L, and the sodium peroxymonosulfate had a concentration of 3.25 mmol/L; and the mixed solution was reacted at 140° C. for 6 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 4

Polyethylene (PE), sulfuric acid, ferrous sulfate, sodium peroxymonosulfate, and water were mixed well to obtain a mixed solution, wherein in the mixed solution, the PE had a mass concentration of 2 g/L, the sulfuric acid had a concentration of $5\times10^{-3.5}$ mol/L, the ferrous sulfate had a concentration of 3.25 mmol/L, and the sodium peroxymonosulfate had a concentration of 3.25 mmol/L; and the mixed solution was reacted at 80° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 5

Polyethylene terephthalate (PET), sulfuric acid, ferrous sulfate, potassium peroxymonosulfate, and water were mixed well to obtain a mixed solution, wherein in the mixed solution, the PET had a mass concentration of 2 g/L, the sulfuric acid had a concentration of $5\times10^{-3.5}$ mol/L, the ferrous sulfate had a concentration of 3.25 mmol/L, and the potassium peroxymonosulfate had a concentration of 3.25 mmol/L; and the mixed solution was reacted at 140° C. for 15 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 10.96%, and $C_{10}H_{12}$ fuel had a mass fraction of 89.04%.

Example 6

Polyethylene terephthalate (PET), sulfuric acid, ferrous sulfate, potassium peroxymonosulfate, and water were mixed well to obtain a mixed solution, wherein in the mixed solution, the PET had a mass concentration of 1 g/L, the sulfuric acid had a concentration of $5\times10^{-3.5}$ mol/L, the ferrous sulfate had a concentration of 3.25 mmol/L, and the potassium peroxymonosulfate had a concentration of 6.50 mmol/L; and the mixed solution was reacted at 140° C. for 15 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer to obtain a graph showing types and mass fractions of the products. As shown in FIG. 2, it can be seen that, in the product obtained in this example, $C_7H_{12}$ fuel had a mass fraction of 55.93%, and $C_{10}H_{12}$ fuel had a mass fraction of 44.07%.

Example 7

Polyethylene (PE), sulfuric acid, copper sulfate, potassium peroxymonosulfate, and water were mixed well to obtain a mixed solution, wherein in the mixed solution, the PE had a mass concentration of 3 g/L, the sulfuric acid had a concentration of $5\times10^{-4}$ mol/L, the copper sulfate had a concentration of 0.1625 mmol/L, and the potassium peroxymonosulfate had a concentration of 6.50 mmol/L; and the mixed solution was reacted at 140° C. for 15 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 62.90%, and $C_{10}H_{12}$ fuel had a mass fraction of 37.10%.

Example 8

Polyethylene terephthalate (PET), sulfuric acid, copper sulfate, potassium peroxymonosulfate, and water were mixed well to obtain a mixed solution, wherein in the mixed solution, the PET had a mass concentration of 3 g/L, the sulfuric acid had a concentration of $5\times10^{-4}$ mol/L, the copper sulfate had a concentration of 0.1625 mmol/L, and the potassium peroxymonosulfate had a concentration of 6.50 mmol/L; and the mixed solution was reacted at 120° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 9

Polyethylene terephthalate (PET), sulfuric acid, copper sulfate, sodium peroxymonosulfate, and water were mixed well to obtain a mixed solution, wherein in the mixed solution, the PET had a mass concentration of 1 g/L, the sulfuric acid had a concentration of $5\times10^{-4}$ mol/L, the copper sulfate had a concentration of 0.1625 mmol/L, and the sodium peroxymonosulfate had a concentration of 6.50 mmol/L; and the mixed solution was reacted at 140° C. for 15 h to complete the treatment.

Figure 3:
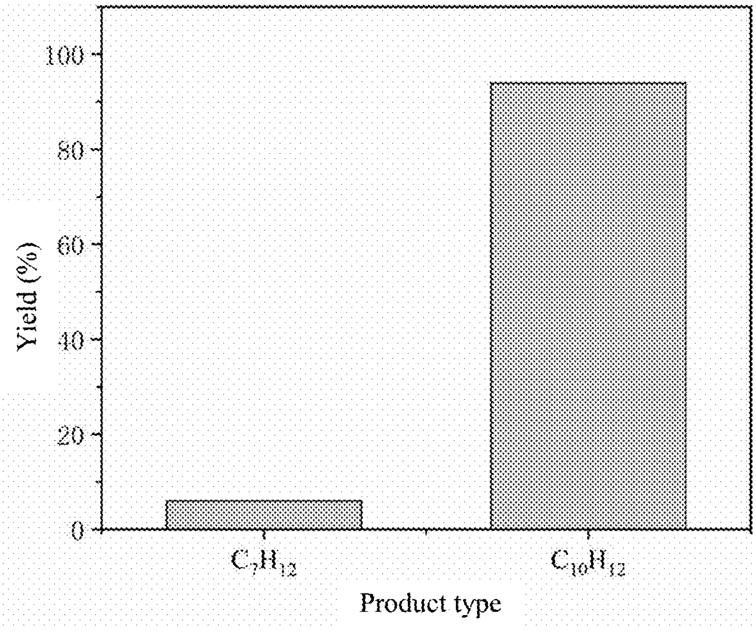
FIG. 3 is a graph showing the results of types and mass fractions of products according to Example 9.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer to obtain a graph showing types and mass fractions of the products. As shown in FIG. 3, it can be seen that, in the product obtained in this example, $C_7H_{12}$ fuel had a mass fraction of 6.95%, and $C_{10}H_{12}$ fuel had a mass fraction of 93.05%.

Example 10

Polyethylene (PE), sulfuric acid, ferrous sulfate, sodium peroxymonosulfate, and water were mixed well to obtain a mixed solution, wherein in the mixed solution, the PE had a mass concentration of 1 g/L, the sulfuric acid had a concentration of $5\times10^{-3}$ mol/L, the ferrous sulfate had a concentration of 6.50 mmol/L, and the sodium peroxymonosulfate had a concentration of 6.50 mmol/L; and the mixed solution was reacted at 140° C. for 15 h to complete the treatment.

Figure 4:
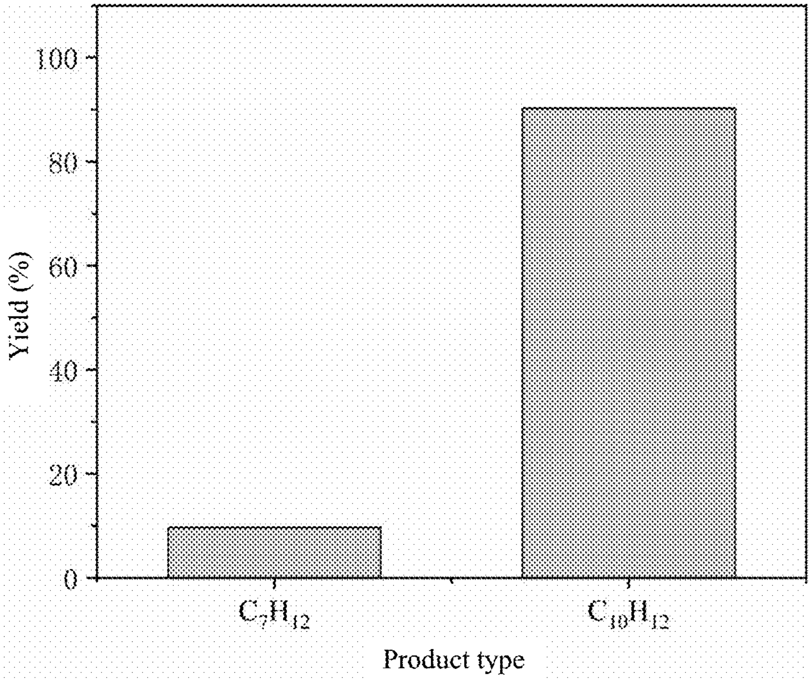
FIG. 4 is a graph showing the results of types and mass fractions of products according to Example 10.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer to obtain a graph showing types and mass fractions of the products. As shown in FIG. 4, it can be seen that, in the product obtained in this example, $C_7H_{12}$ fuel had a mass fraction of 9.71%, and $C_{10}H_{12}$ fuel had a mass fraction of 90.29%.

Example 11

Polyethylene terephthalate (PET), sulfuric acid, ferrous sulfate, sodium peroxymonosulfate, and water were mixed well to obtain a mixed solution, wherein in the mixed solution, the PET had a mass concentration of 3 g/L, the sulfuric acid had a concentration of $5\times10^{-3}$ mol/L, the ferrous sulfate had a concentration of 6.50 mmol/L, and the sodium peroxymonosulfate had a concentration of 6.50 mmol/L; and the mixed solution was reacted at 140° C. for 3 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 12

Polyethylene (PE), sulfuric acid, copper sulfate, potassium peroxymonosulfate, and water were mixed well to obtain a mixed solution, wherein in the mixed solution, the PE had a mass concentration of 4 g/L, the sulfuric acid had a concentration of $5\times10^{-3.5}$ mol/L, the copper sulfate had a concentration of 0.3250 mmol/L, and the potassium peroxymonosulfate had a concentration of 9.75 mmol/L; and the mixed solution was reacted at 80° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 13

Polyethylene terephthalate (PET), sulfuric acid, copper sulfate, potassium peroxymonosulfate, and water were mixed well to obtain a mixed solution, wherein in the mixed solution, the PET had a mass concentration of 4 g/L, the sulfuric acid had a concentration of $5\times10^{-3.5}$ mol/L, the copper sulfate had a concentration of 0.3250 mmol/L, and the potassium peroxymonosulfate had a concentration of 9.75 mmol/L; and the mixed solution was reacted at 140° C. for 15 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 6.95%, and $C_{10}H_{12}$ fuel had a mass fraction of 93.05%.

Example 14

Polyethylene (PE), sulfuric acid, ferrous sulfate, potassium peroxymonosulfate, and water were mixed well to obtain a mixed solution, wherein in the mixed solution, the PE had a mass concentration of 5 g/L, the sulfuric acid had a concentration of $5\times10^{-4}$ mol/L, the ferrous sulfate had a concentration of 9.75 mmol/L, and the potassium peroxymonosulfate had a concentration of 9.75 mmol/L; and the mixed solution was reacted at 140° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 15

Polyethylene terephthalate (PET), sulfuric acid, ferrous sulfate, potassium peroxymonosulfate, and water were mixed well to obtain a mixed solution, wherein in the mixed solution, the PET had a mass concentration of 5 g/L, the sulfuric acid had a concentration of $5\times10^{-4}$ mol/L, the ferrous sulfate had a concentration of 9.75 mmol/L, and the potassium peroxymonosulfate had a concentration of 9.75 mmol/L; and the mixed solution was reacted at 100° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 16

Polyethylene (PE), sulfuric acid, copper sulfate, sodium peroxymonosulfate, and water were mixed well to obtain a mixed solution, wherein in the mixed solution, the PE had a mass concentration of 1 g/L, the sulfuric acid had a concentration of $5\times10^{-3}$ mol/L, the copper sulfate had a concentration of 0.4875 mmol/L, and the sodium peroxymonosulfate had a concentration of 13 mmol/L; and the mixed solution was reacted at 100° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 17

Polyethylene terephthalate (PET), sulfuric acid, copper sulfate, sodium peroxymonosulfate, and water were mixed well to obtain a mixed solution, wherein in the mixed solution, the PET had a mass concentration of 1 g/L, the sulfuric acid had a concentration of $5\times10^{-3}$ mol/L, the copper sulfate had a concentration of 0.4875 mmol/L, and the sodium peroxymonosulfate had a concentration of 13 mmol/L; and the mixed solution was reacted at 80° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 18

Polyethylene (PE), sulfuric acid, ferrous sulfate, sodium peroxymonosulfate, and water were mixed well to obtain a mixed solution, wherein in the mixed solution, the PE had a mass concentration of 2 g/L, the sulfuric acid had a concentration of $5\times10^{-3.5}$ mol/L, the ferrous sulfate had a concentration of 13 mmol/L, and the sodium peroxymonosulfate had a concentration of 13 mmol/L; and the mixed solution was reacted at 140° C. for 3 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

Example 19

Polyethylene terephthalate (PET), sulfuric acid, ferrous sulfate, sodium peroxymonosulfate, and water were mixed well to obtain a mixed solution, wherein in the mixed solution, the PET had a mass concentration of 2 g/L, the sulfuric acid had a concentration of $5\times10^{-3.5}$ mol/L, the ferrous sulfate had a concentration of 13 mmol/L, and the sodium peroxymonosulfate had a concentration of 13 mmol/L; and the mixed solution was reacted at 80° C. for 12 h to complete the treatment.

The obtained sample was naturally cooled to room temperature. 0.9 mL of suspension was taken by using a syringe, and filtered by using a 0.22 μm organic filter membrane. The filtrate was extracted by using 0.9 mL of methylbenzene after the filtering was completed. Finally, the types of products and the proportions of various substances were qualitatively analyzed by using a gas chromatography-mass spectrometer. The results show that, in the product obtained in this example, $C_7H_{12}$ fuel had a mass fraction of 0%, and $C_{10}H_{12}$ fuel had a mass fraction of 100%.

According to the above examples, the present invention provides a method for treating a waste plastic based on a persulfate system, which comprises the following steps: mixing the waste plastic, sulfuric acid, sulfate, peroxymonosulfate, and water, and reacting at 80-140° C. for 3-15 h to complete the treatment. The present invention reasonably regulates and controls each parameter in the reaction process while constructing a homogeneous catalysis system of transition metal (bivalent copper and bivalent iron) activated peroxymonosulfate, and finally directionally converts the waste plastic into $C_7H_{12}$ and $C_{10}H_{12}$ fuels, which realizes high-efficiency recycling of the waste plastic, has a simple and convenient working procedure, and has a wide application prospect.

The above descriptions are only preferred examples of the present invention. It should be noted that those of ordinary skill in the art can also make several improvements and modifications without departing from the principle of the present invention, and such improvements and modifications shall fall within the protection scope of the present invention.

What is claimed is:

1. A method for a treatment of a waste plastic based on a persulfate system, comprising the following steps:

mixing the waste plastic, sulfuric acid, sulfate, peroxymonosulfate, and water to obtain a mixed solution, and then allowing a reaction of the mixed solution;

and after the reaction, filtering the reacted mixed solution to obtain a filtrate, and extracting the filtrate to obtain an extract comprising a $C_7H_{12}$ fuel and a $C_{10}H_{12}$ fuel.

2. The method according to claim 1, wherein the waste plastic is polyethylene or polyethylene terephthalate.

3. The method according to claim 2, wherein the sulfate is copper sulfate or ferrous sulfate.

4. The method according to claim 3, wherein the peroxymonosulfate is potassium peroxymonosulfate or sodium peroxymonosulfate.

5. The method according to claim 4, wherein the waste plastic in the mixed solution has a mass concentration of 1-5 g/L.

6. The method according to claim 3, wherein the waste plastic in the mixed solution has a mass concentration of 1-5 g/L.

7. The method according to claim 6, wherein the sulfuric acid in the mixed solution has a concentration of $5\times10^{-4}$-$5\times10^{-3}$ mol/L.

8. The method according to claim 7, wherein when the sulfate is the copper sulfate, the copper sulfate in the mixed solution has a concentration of 0.08-0.49 mmol/L; and when the sulfate is the ferrous sulfate, the ferrous sulfate in the mixed solution has a concentration of 3-13 mmol/L.

9. The method according to claim 8, wherein the peroxymonosulfate in the mixed solution has a concentration of 3-13 mmol/L.

10. The method according to claim 9, wherein the reaction is performed at a temperature of 80-140° C.

11. The method according to claim 8, wherein the reaction is performed at a temperature of 80-140° C.

12. The method according to claim 11, wherein the reaction is performed for 3-15 h.

* * * * *